US009323723B2

(12) United States Patent
Rounthwaite (10) Patent No.: US 9,323,723 B2
(45) Date of Patent: Apr. 26, 2016

(54) READING EASE OF TEXT ON A DEVICE (75) Inventor: Robert L. Rounthwaite, Fall City, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 13/163,084

(22) Filed: Jun. 17, 2011

(65) Prior Publication Data
US 2012/0324348 A1  Dec. 20, 2012

(51) Int. Cl.
*G06F 3/00* (2006.01)
*G06F 17/21* (2006.01)

(52) U.S. Cl.
CPC ................................ *G06F 17/211* (2013.01)

(58) Field of Classification Search
CPC ... G06F 3/0481; G06F 3/0482; G06F 3/0484; G06F 3/1257; G06F 17/211
USPC .................. 715/234, 243, 244, 254, 255, 256
See application file for complete search history.

(56) References Cited

U.S. PATENT DOCUMENTS

| 5,802,533 | A | | 9/1998 | Walker | |
|---|---|---|---|---|---|
| 6,154,757 | A | * | 11/2000 | Krause et al. | 715/205 |
| 6,279,017 | B1 | | 8/2001 | Walker | |
| 7,036,075 | B2 | | 4/2006 | Walker | |
| 7,069,508 | B1 | | 6/2006 | Bever | |
| 7,346,489 | B1 | | 3/2008 | Bever | |
| 7,861,163 | B2 | | 12/2010 | Walker | |
| 7,987,421 | B1 | * | 7/2011 | Timothy et al. | 715/243 |
| 2002/0091713 | A1 | | 7/2002 | Walker | |
| 2004/0139400 | A1 | | 7/2004 | Allam et al. | |
| 2006/0139312 | A1 | | 6/2006 | Sinclair et al. | |
| 2006/0206836 | A1 | | 9/2006 | Wessling et al. | |
| 2010/0169825 | A1 | * | 7/2010 | Krause | 715/784 |
| 2010/0180197 | A1 | | 7/2010 | Ohashi | |
| 2012/0036455 | A1 | * | 2/2012 | Holt et al. | 715/753 |
| 2012/0108960 | A1 | * | 5/2012 | Halmann et al. | 600/437 |
| 2013/0027608 | A1 | * | 1/2013 | Belisomi et al. | 348/441 |

OTHER PUBLICATIONS

Maeda; et al., "WebDigest: Layout-preserving Visually Enhanced Web Pages"—Published Date: Jan. 27-31, 2003 http://ieeexplore.ieee.org/stamp/stamp.jsp?tp=&arnumber=1183088.
Zuffi; et al., "Human Computer Interaction: Legibility and Contrast"—Published Date: Sep. 10-14, 2007 http://ieeexplore.ieee.org/stamp/stamp.jsp?tp=&arnumber=4362786.

* cited by examiner

*Primary Examiner* — Kyle Stork
(74) *Attorney, Agent, or Firm* — Alin Corie; Sandy Swain; Micky Minhas (57) ABSTRACT

One or more techniques and/or systems are disclosed for improving reading ease of text displayed by a device. Reading-related feedback, such as feedback that indicates user reading speed and/or user reading comprehension, can be received for a user of the device. One or more display-related characteristics, such as characteristics that indicate how text is displayed by the device, can be received for the device. Using the reading-related feedback and the one or more display-related characteristics, a reading model can be created that can indicate desired display parameters for displaying the text on the device. The desired display parameters indicated by the reading model may be used to improve reading ease of the text, displayed by the device, for the user.

20 Claims, 8 Drawing Sheets

READING EASE OF TEXT ON A DEVICE

BACKGROUND

Computer-based presentation of text for reading by a user may be provided in a variety of ways and for a variety of purposes. For example, enterprise-based documents, contracts, technical specifications, etc. are often presented on a computer monitor, where the user may view large sections of the document at a time, may provide edits, and/or adjust presentation parameters of the displayed text. As another example, e-readers are typically designed to present books (e.g., novels, text-books), newspapers, and magazines to the user in a format that the user may be used to when reading these items in paper form. As another example, handheld device and smart phones are also used to view text, which may range from enterprise-based documents, to books, and online pages. In this example, the smaller portable device may provide certain limitations when attempting to read text (e.g., text size, amount on screen, etc.).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Reading text can be a complex process that is different for respective users (readers), involving a variety of factors that may influence reading performance and/or reading ease. As an example, two different users of the same text on a same device may have different reading experiences, where one is able to read faster and/or comprehend more, than the other based on how the text is presented. Display devices often enable a great deal of flexibility in how the text is displayed. For example, a creator of the text and/or the user (e.g., or some other party) may select a font size, margin size, line spacing, etc. to accommodate a desired reading ease. These choices may serve to set a style and/or mood of the text, and may affect an "ease" with which the text can be read by the user.

As an example, when consuming large quantities of text (e.g., when reading a book), it may be assumed by most reading applications that the user should select parameters to optimize reading ease. However, users typically have little way of knowing what they may actually find most comfortable, for example. There can be a trade-off between text size and a number of words that are displayed on a page, for example, without needing to advance to a next page. Further, as an example, smaller text may be less readable on a per-word basis but may increase overall reading speed by reducing a time and cognitive load of paging.

Additionally, typical reading applications (e.g., or devices) merely provide one or a few options that are user-adjustable; and a fully flexible system, which may include many tunable parameters is likely to overwhelm most users. Previously, solutions to improving reading ease may have either relied on the content creators to set the display parameters (e.g., typically based on traditional practices from the print world), or may have left it up to the end-user to make desired adjustments.

Accordingly, one or more techniques and/or systems are disclosed that provide a solution to the problem of choosing these factors, for example, by automatically providing desired display parameters that may be used to adjust the displayed text to improve reading ease, such as reading speed, for a user. Information about how a user typically interacts with text (e.g., user reading characteristics) can be identified, as well as typical display characteristics of a device (e.g., or device type, or a plurality of devices), and used to create a reading model. The reading model may be able to identify desired display parameters for a particular device (e.g., or general device group(s)), for a particular user, which can be used to adjust the display of the text to improve reading ease (e.g., reading speed and/or reading comprehension).

In one embodiment of improving reading ease of text displayed by a device, reading-related feedback can be received for a user of the device, and one or more display-related characteristics can be received for the device. The reading related feedback may indicate how fast the user reads the text and/or how much the user comprehends the displayed text. Further, a reading model can be created, based at least in part upon the reading-related feedback and the one or more display-related characteristics, where the reading model may indicate desired display parameters for displaying the text on the device. Additionally, reading ease of the text displayed by the device for the user can be improved by applying the reading model.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

It will be appreciated that the term "text" is not intended to limit the techniques or systems described herein to any particular embodiment. The terms "text" can comprise a character, characters, a number, numbers, a symbol, symbols, and/or other articles that may be displayed on a display coupled with or part of a device. In the techniques and/or systems described herein, the respective characters, numbers, symbols, and other articles displayed may be expressed as "text" or "texts," but are not merely limited to traditional notions of text.

Accordingly, as provided herein, a method may be devised that provides for identifying and improving reading ease of text on device displays (e.g., electronic devices, such as smart phones, e-readers, monitors, etc.). A user's ease of reading text on a display, which may comprise reading speed and/or reading comprehension, may be deduced from user interactions with the device and/or text while reading. Other reading-related characteristics (e.g., characteristics that may affect reading ease) can be identified, and a reading model can be created and used to identify desired display parameters for a particular display of text. In this way, for example, the reading ease of the user may be improved by applying the desired display parameters to the device. It may be appreciated that reading ease and/or the like as used herein is meant to have a broad interpretation. For example, reading ease may be related to performance at least in that something that is easier to read may allow a user to perform better (e.g., read faster, have increased comprehension, etc.). Reading ease may similarly be related to how enjoyable, comfortable, effortless, etc. something is for a user to read.

Figure 1:
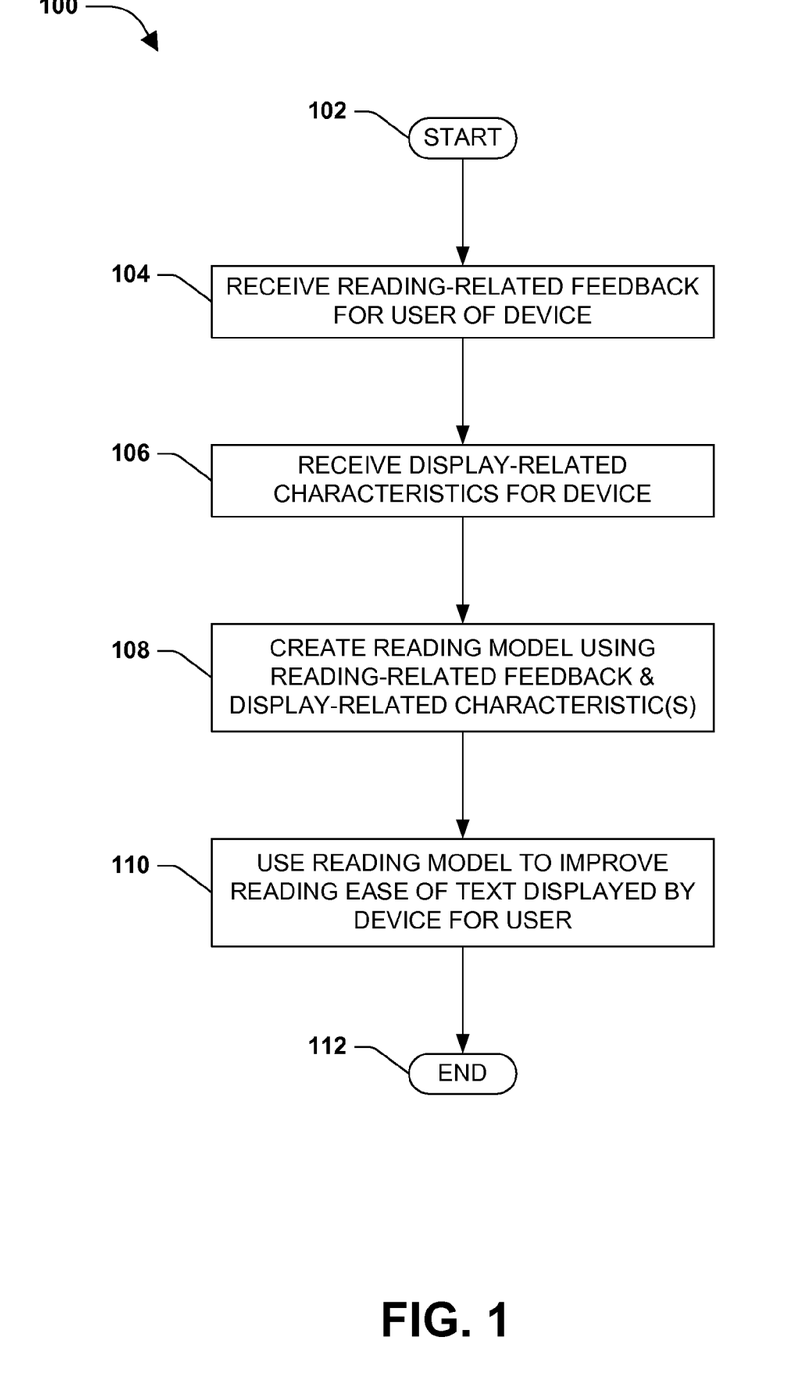
FIG. 1 is a flow diagram illustrating an exemplary method for improving reading ease of text displayed by a device.

FIG. 1 is a flow diagram illustrating an exemplary method 100 for improving reading ease of text displayed by a device. The exemplary method 100 begins at 102 and involves receiving reading-related feedback for a user of the device, at 104. At 106, one or more display-related characteristics of the device are also received. The reading-related feedback for the user of the device, and the one or more display-related characteristics are used to create a reading model, at 108. The reading model is used to improve reading ease of the text that is displayed by the device for the user, at 110. Having improved the reading ease, the exemplary method ends at 112. It may be appreciated that reading-related data (e.g., reading reading-related feedback and/or display-related characteristics) may be under the control of a program, component, module, etc. which, in turn, alters display parameters (e.g., display-related characteristics) based upon received reading-related data to collect (further) data related to the effect the (adjusted) parameters have on the user (e.g., reading ease of the user). It may be appreciated that this may allow a reading model to be adjusted (e.g., improved) to facilitate adjusting one or more display parameters (e.g., provide different choices/values for different parameters) over time and/or in real-time. Thus, feedback can be implemented to, among other things, dynamically adjust one or more parameters that are implemented when monitoring reading ease for a user. Stated another way, modeling need not merely be static, but may also be dynamic such that different parameters, etc. (or rather values thereof) may be "tried-out" and depending upon resulting reading-related data (e.g., page turn speed, page back count, etc.) one or more parameters (e.g., respective values thereof) may be dynamically adjusted to provide different reading-related data to further adjust, evolve, etc. the model and/or parameters (e.g., until a desired result/reading ease is obtained). It may be appreciated that a static embodiment is generally a precursor to a dynamic embodiment. That is, a first iteration through the loop is generally performed before a subsequent iteration can be traversed (e.g., with adjusted parameters/values). Accordingly, a system, method, etc. that accomplishes a dynamic embodiment generally accomplishes a static embodiment as well.

In one aspect, one or more users can provide reading-related feedback for one or more different devices. In one embodiment, one or more users can provide reading-related feedback for an individual device, a plurality of devices of a same device-type (e.g., e-readers) as that of the device, and/or a plurality of different devices of different device types (e.g., smart phones, e-readers, laptops, computer monitors, television monitors, (hard copy) print out, etc.). The reading-related feedback can indicate a reading ease for the user of the device (e.g., or device-type, or generally), for example. The reading ease may comprise indications of how fast the user can read the text (reading speed) and/or how much information the user understands/recalls from the text (reading comprehension). That is, for example, a faster reading speed and/or an increased reading comprehension, can indicate an improved reading ease.

It will be appreciated that an increase in reading speed may not always indicate improved reading ease. For example, where reading comprehension may be a more desired factor, the user may need to decrease their reading speed in order to improve their reading comprehension. Either way, in one embodiment, an improvement in reading ease may be indicated by an improvement in reading speed and/or reading comprehension, which may be achieved by utilizing the reading model to adjust display characteristics for the text on the display.

In one embodiment, the reading-related feedback may comprise user (e.g., or users) actions and/or user input when reading text on a display of the device (e.g., or a plurality of the same or different types of devices). For example, when reading text on a display the user typically scrolls down the page when they get to an end of displayed text, or may switch to (e.g., turn to) a next page. In this example, the indication of scrolling and/or switching may provide an indication of reading speed. As another example, a user's action may be observed, such as by an eye movement detector (e.g., camera built into the device/display), that can observe the user's actions, such as how their eyes move across a page, and/or on which words they are focused. The user's actions may help indicate a reading speed and/or a reading comprehension (e.g., user looking back at previous text to find words).

As another example, the user (e.g., or users) may input information as reading-related feedback that provides an indication of reading speed and/or reading comprehension. For example, a user may input a beginning and end time for reading the text, which can indicate a reading speed. Further, for example, the user may be asked a series of questions related to the content of the text to test for reading comprehension. As an illustrative example, students using a device to display text related to a subject may be asked to take a quiz after reading the text to determine reading comprehension (e.g., test results, test performance, etc.).

Display-related characteristics for a device can comprise things that affect how the user views text being displayed by the device, for example. In one embodiment, the display may comprise alterable and/or unalterable display characteristics. For example, a display's brightness, text font size, text spacing, kerning, text font type, text color, line spacing, margins, and/or other characteristics may (e.g., or may not) be alterable by the user and/or by the device (e.g., as default settings). Further, as an example, a display's pixel density, screen size and resolution, brightness capability, color fidelity, and or other characteristics may not (e.g., or may) be able to be altered. In one embodiment, one or more of these characteristics may comprise or rather be comprised by the phrase display-related characteristics and/or the like, for example, which may affect reading ease for the user.

Additionally, in one embodiment, display-related characteristics for a device may (also or alternatively) comprise information about the text and/or information about a current viewing page of the text. For example, information about the text can comprise subject matter, date of publication, certain statistics, such as vocabulary difficulty (e.g., using a vocabulary histogram), average sentence length, word length, sentence structure and/or other information. As another example, information about the current viewing page can comprise a number of words on the page, number of paragraphs, and other statistics about the page makeup. In one embodiment, one or more of these text and/or page characteristics may comprise or rather be comprised by the phrase display-related characteristics and/or the like, for example, which can also affect reading ease for the user. It may be appreciated that such features, characteristics, etc. related to content (e.g., sentence length, sentence structure, etc.) are intended to be comprised by the terms display-related characteristics (for a device) and/or the like as used herein at least for purposes of simplicity. That is, although it may be more conventional to refer to merely brightness, contrast, sharpness, etc. as display-related characteristics for a device, other features, attributes, aspects, etc. (e.g., vocabulary terms) related to the subject matter, content, text, etc. that is being displayed (and less related to the characteristics, settings, etc. of the device upon which it is displayed) are nevertheless intended to be comprised within the verbiage display-related characteristics for a device and/or the like as used herein to, among other things, have nomenclature that can be used/referenced to encompass any one or more of these items that can affect reading ease, for example. Thus, even though such usage may be expansive and/or less conventional, such a broad interpretation is nevertheless intended herein, at least for purposes of explanation, conciseness in discussion, etc.

In one embodiment, creating a reading model can comprise using machine learning to train a classifier, such as by training the classifier over reading-related characteristics, resulting in model that may predict a desired reading ease metric, for example. In another embodiment, a statistical model may be created using the reading-related characteristics. In this embodiment, for example, the statistical model may be used to predict desired characteristics for improving the reading ease (e.g., based on averages, standard curves, or other statistical measures). It will be appreciated that the reading model (e.g., creation thereof) is not limited to any particular embodiment, merely that the model utilize the reading-related feedback and display-related characteristics to help identify reading ease characteristics, for example, which may be used to improve reading ease for a user of the device.

As an illustrative example, the reading model can be used to identify desired characteristics (e.g., optimized for reading ease) for the particular user of the device, for a group of users of the same device-type, and/or for a group of users of a plurality of device types (e.g., a general model). In this example, the desired characteristics may comprise ways to display the text on the device, such as a particular brightness level, contrast level, font type, font size, font color, line spacing, character spacing, words per line, words per page, background color, etc. Further, the desired characteristics may be applied to the display of the text on the device, for example, such that the reading ease for the user is improved (e.g., as compared to other manners of displaying the text, such as over the standard display version of the text). That is, for example, the displayed text can be optimized for the user (e.g., or group of users) based on their how they read text, and on how the device displays text (e.g., each device displays text differently).

Figure 2:
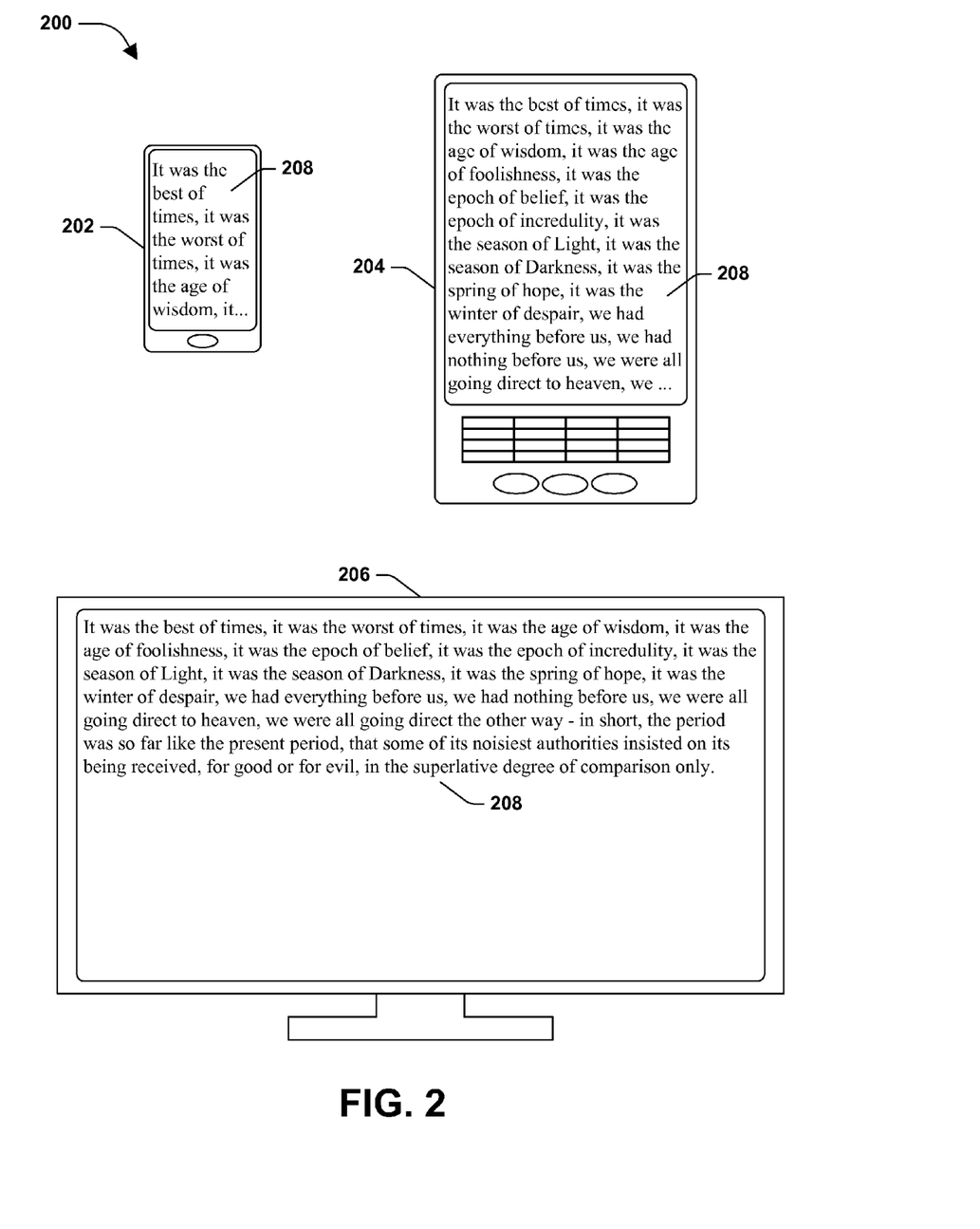
FIG. 2 illustrates an example embodiment of different devices displaying a same text.

As an illustrative example, FIG. 2 illustrates an example embodiment 200 of different devices displaying a same text. In the example embodiment 200, a smart phone 202, an e-reader 204, and a computer monitor 206, respectively display a portion of text 208 on their display. In this example embodiment 200, the displayed text 208 comprises a passage, the entirety of which can be displayed by the monitor 206, but merely a portion of which can be displayed, respectively, by the e-reader 204 and smart phone 202. Further, in this example 200, the text 208 comprises a same font type, size, spacing, etc. when displayed on the respective devices 202, 204, 206.

As an example, each display may have advantages and disadvantages for reading the text 208. For example, the monitor 206 may be able to display more text, but the text is may be difficult to read, for some users, due to the type, size and spacing. As another example, the text on the smart phone may be easier to read, even though it comprises the same display characteristics, but continual reading of the passage can become more difficult due to the small number of words, and arrangement of words, on the display.

In one embodiment, the display characteristics of the respective devices 202, 204, 206, along with the reading-related feedback of the user of the device (e.g., how they interact with the text), may be used by the reading model to identify desired display characteristics for the device that can improve the reading ease for the user. In this example, the desired characteristics can be applied to adjust how the text 208 is displayed, such that the respective devices 202, 204, 206 comprise different ways to display the text 208 to improve reading ease for the user (e.g., improving reading speed, and/or reading comprehension). For example, the size of the text may be reduced for the smart phone 202, while the spacing between words may be increased for the e-reader 204 and/or the monitor 206.

Figure 3:
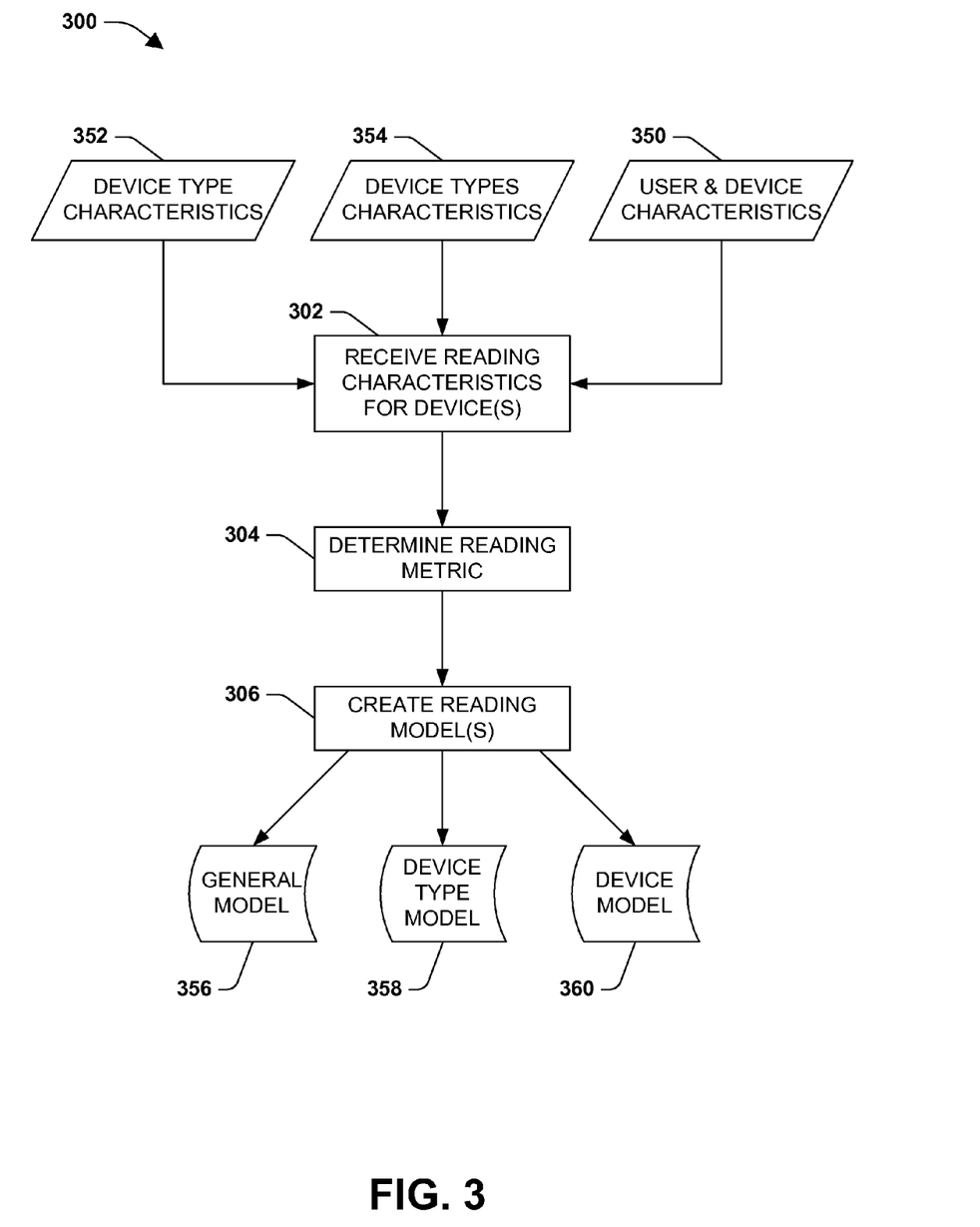
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented. At 302, reading-related characteristics are received. As described above, reading-related characteristics may comprise parameters that can affect the reading ease of text displayed on a device, such as feedback from a user (e.g., indicating reading speed and/or reading comprehension), display-related characteristics (e.g., device display parameters, text display related parameters, etc.), user-related characteristics (e.g., age, education level, nationality, etc.), and/or characteristics about the user's reading environment (e.g., location, ambient light, ambient noise, time of day, distance between user and display, etc.).

In one embodiment, the reading-related characteristics may pertain to user and device characteristics 350 that may be received for one or more users of the device (e.g., multiple users of the same device), comprising reading-related feedback for the user(s) of the device and display related characteristics for the device. In one embodiment, reading related feedback for one or more users of the device may be identified by a training service (e.g., installed locally on the device and/or residing remotely from the device), for example, which may present "training text" with which the user(s) may interact (e.g., read, scroll, switch pages, etc.). In this embodiment, the user(s) can interact with the "training text," for example, and the training service can collect interaction feedback for the respective one or more users of the device.

In another embodiment, the reading-related characteristics may pertain to characteristics for a particular device type 352 that may be received for one or more users of a set of devices comprising a device type (e.g., smart phones), of which the device is member (e.g., the device is a smart phone). In this embodiment, the reading-related characteristics may comprise reading-related feedback for the user(s) and/or display-related characteristics for the devices in the device-type set. For example, in order to create a device-type reading model (e.g., one that can be applied to respective devices that are members of the device-type set), reading-related characteristics may be used for a plurality of users and a plurality of devices from the device-type set (e.g., smart phone). In this way, for example, a larger sampling of data may be identified for use in creating the device-type reading model.

In another embodiment, the reading-related characteristics may pertain to characteristics for different device types 354 that may be received for one or more users of one or more different devices types (e.g., smart phones, e-readers, handheld devices, laptops, and/or computer monitors). In this embodiment, the reading-related characteristics 354 may comprise reading-related feedback for the user(s) of the device(s) and/or display-related characteristics for the device(s) in different device-type sets. For example, a first general reading model may be developed for a first type of device, a second general reading model may be developed for a second type of device, etc., where the first model may be applied to a device that is of the first type, the second model may be applied to a device that is of the second type, etc. In this example, reading-related characteristics may be collected from a plurality of users and a plurality of device types, and applied to create the general reading models.

At 304 in the example embodiment 300, a reading metric can be determined, for example, using one or more of the reading-related characteristics. As an example, a simple, apparent reading speed may comprise a reading metric that identifies reading ease. That is, for example, a faster reading speed may indicate a more desirable reading ease than a slower reading speed. As another example, a reading comprehension measurement may comprise a reading metric that identifies reading ease. For example, an increased reading comprehension may indicate a more desired reading ease metric. As another example, a combination of reading speed and reading comprehension may comprise the reading metric that identifies reading ease. In this example, a faster reading speed and/or an increased reading comprehension may indicate a desired reading ease metric.

At 306, the reading model can be created. In one embodiment, creating a reading model can comprise combining one or more sets of characteristics that affect reading of the text on the device to create a set of desired characteristics for displaying the text on the device. In one embodiment, creating a reading model can comprise combining one or more sets of characteristics that affect a user reading speed for the text on the device to create a set of desired user reading speed characteristics for displaying the text on the device. In another embodiment, creating a reading model can comprise combining one or more sets of characteristics that affect a user reading comprehension of the text on the device to create a set of desired user comprehension characteristics for displaying the text on the device.

As an example, a statistical model (e.g., or trained classifier) may be identified using one or more of the sets of reading-related characteristics (e.g., from one device, a device-type, and/or a plurality of device types). In this example, the user reading speed characteristics that provide a desired reading speed and/or the user reading comprehension characteristics that provide a desired comprehension level can be identified by the statistical model. Further, these identified, desired reading-related characteristics may be applied to the text displayed on the device, to provide a desired reading ease improvement for the user.

In one embodiment, the created reading model may comprise a device reading model 360. For example, the reading model may be created merely for the device and/or merely for the user of the device. In another embodiment, the created reading model may comprise a device-type reading model 358. For example, the reading model can be created for devices that are a member of the device-type set (e.g., laptops), where a device that is a member of the set may utilize the reading model. In another embodiment, the created reading model may comprise a general reading model 356 for a plurality of device types. For example, the reading model can be created for different device-types, and may be used by any device that is a member of one of the device-type sets covered by the general model.

Further, in one embodiment, two or more of the models 356, 358, 360 may be combined. For example, the general model 356 may be used by a device, and combined with the device model 360 for that device. As another example, the device type model 358 may be combined with the device model 360 for a device that is a member of the device-type set covered by the device-type model 358.

Figure 4:
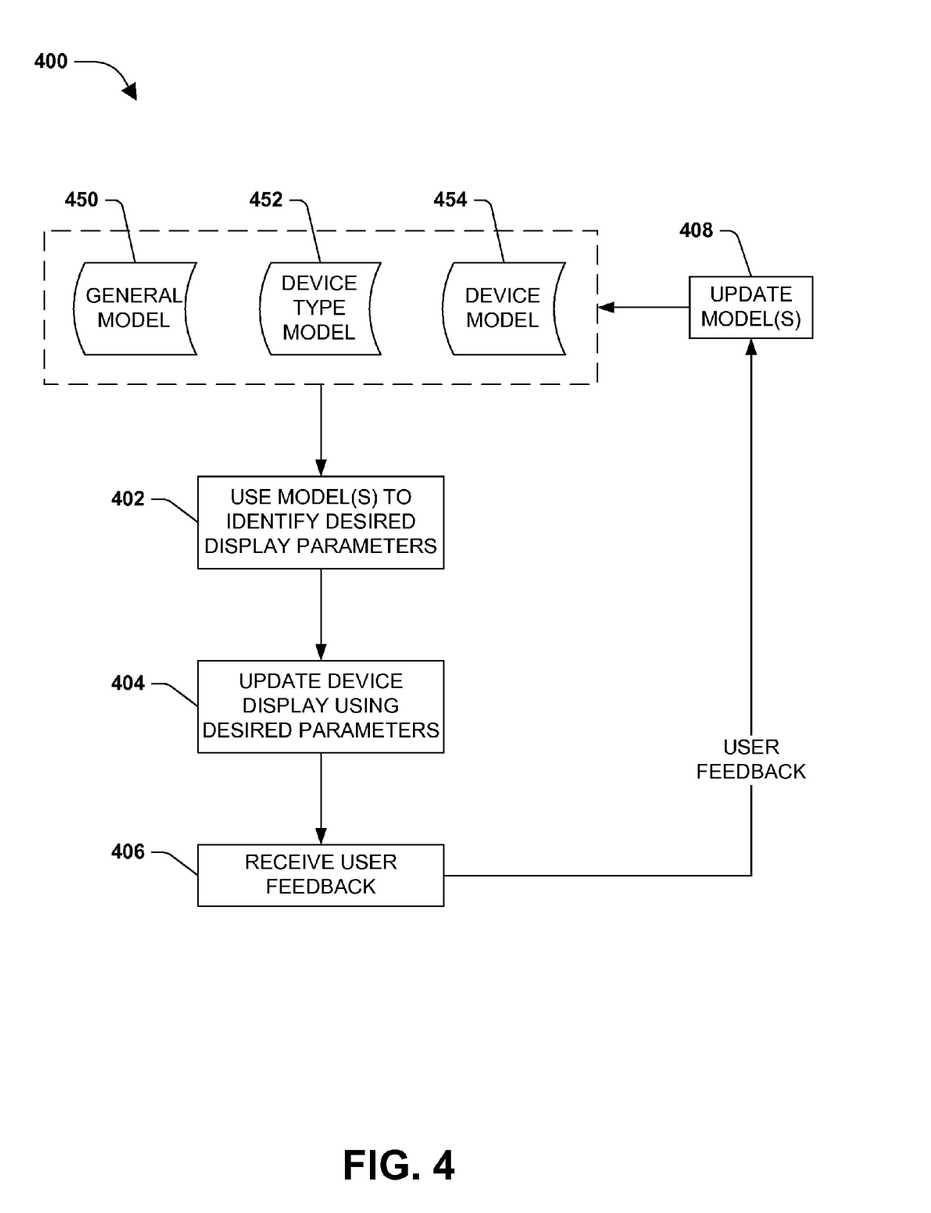
FIG. 4 is a flow diagram illustrating an example embodiment where one or more portions of one or more techniques described herein may be implemented.

FIG. 4 is a flow diagram illustrating an example embodiment 400 where one or more portions of one or more techniques described herein may be implemented. At 402, one or more reading models 450, 452, 454 may be used to identify one or more desired display parameters. For example, characteristics of the device (e.g., brightness levels, pixel density, etc.), characteristics of the user and reading environment (e.g., user age, education, reading location), and text characteristics (e.g., vocabulary, subject, etc.) may be identified and applied to the desired model 450, 452, 454 (e.g., or combination of the models) to identify the desired (e.g., optimized) parameters for displaying the text on the device (e.g., font type, size, spacing, contrast, brightness, color, margins, columns, words per page, etc.).

At 404, the desired display parameters can be applied to the text displayed on the device. For example, depending on user characteristics, text characteristics, environmental conditions, etc., the text may be displayed differently for respective users of the device and/or under different conditions. In this way, for example, a desired text display can be provided to the user to improve reading ease. At 406, user feedback for the displayed text can be received. For example, as the user interacts with the displayed text, by scrolling, switching pages, entering input, and/or viewing words (e.g., as indicated by an eye movement detector), etc., this information can be provided as the users reading-related feedback (e.g., in real-time).

At 408, the user feedback may be used to update one or more of the reading models 450, 452, 454. In this way, for example, the updated model may be used to identify updated display parameters, at 402, which may be used to update the device display, at 404. Further, additional user feedback can be received for the updated display, at 406. In one embodiment, the model may be continually updated (e.g., in real-time), to apply various updated display parameters and receive corresponding feedback. In this way, for example, the model may be updated to provide improved reading ease parameters for the display, based on continuous (e.g., or ongoing) feedback from the user.

Figure 5:
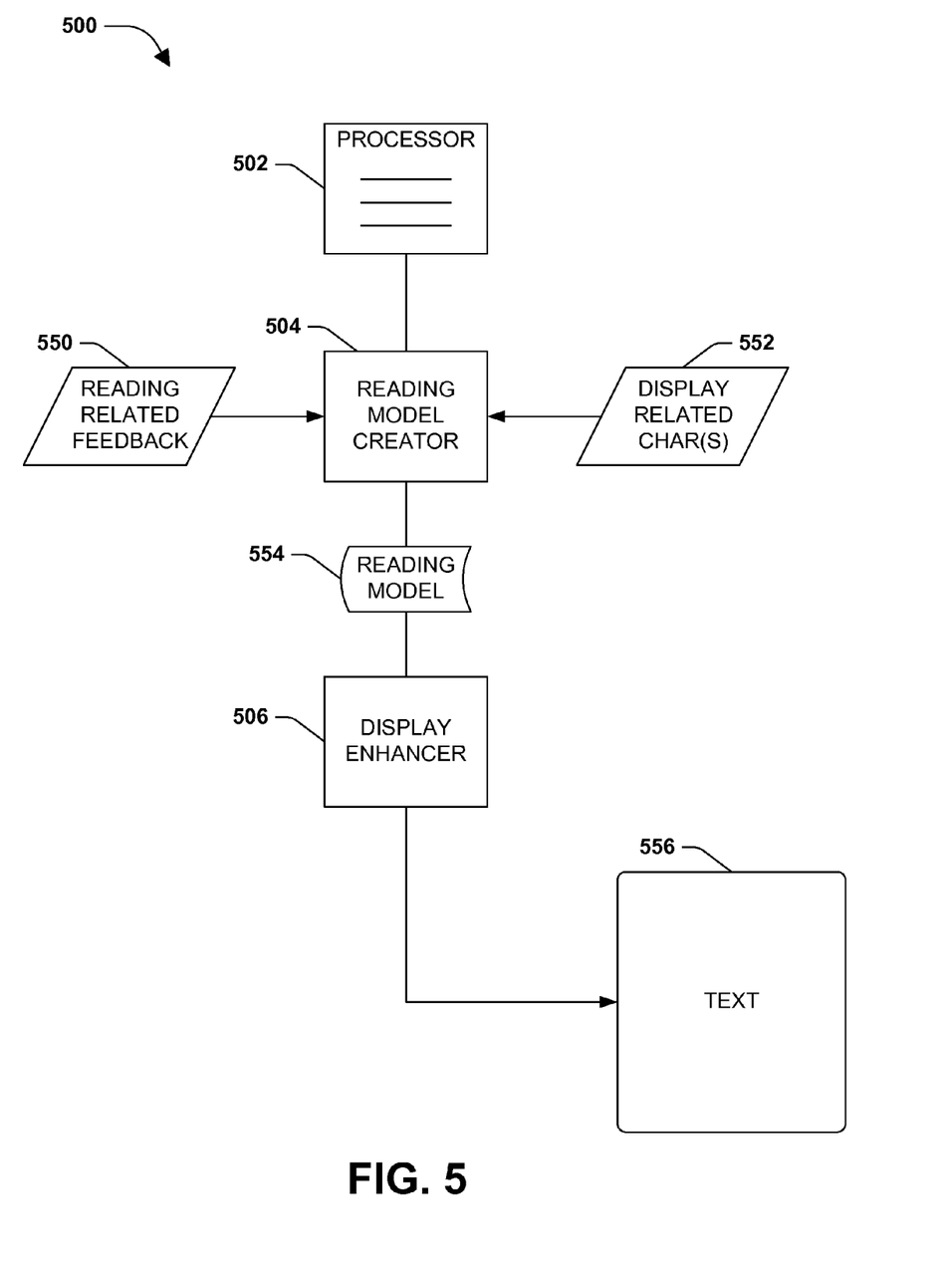
FIG. 5 is a component diagram of an exemplary system for improving reading ease of text displayed by a device.

FIG. 5 is a component diagram of an exemplary system 500 for improving reading ease of text displayed by a device. A computer-based processor 502 is configured to process data for the system, and is operably coupled with a reading model creation component 504. The reading model creation component 504 is configured to create a reading model 554 based at least in part upon received reading-related characteristics. The reading related characteristics comprise reading-related feedback 550 for a user of the device, and one or more display-related characteristics 552 for the device.

In the exemplary system 500, a display enhancement component 506 is operably coupled with the reading model creation component 504. The display enhancement component 506 is configured to improve reading ease of the text displayed 558 by the device for the user based at least upon the reading model 554. For example, the reading model creation component 504 can use the reading-related characteristics (e.g., user reading speed information and/or user reading comprehension information, et.) and the display-related characteristics 552 (e.g., text related information and/or device display related information, etc.) to create a model that may be used to identify desired parameters for displaying the text 556 on the device. In this example, the display enhancement component 506 may use the identified desired parameters to enhance the displayed text 556 on the device, such that the reading ease is improved for the user.

Figure 6:
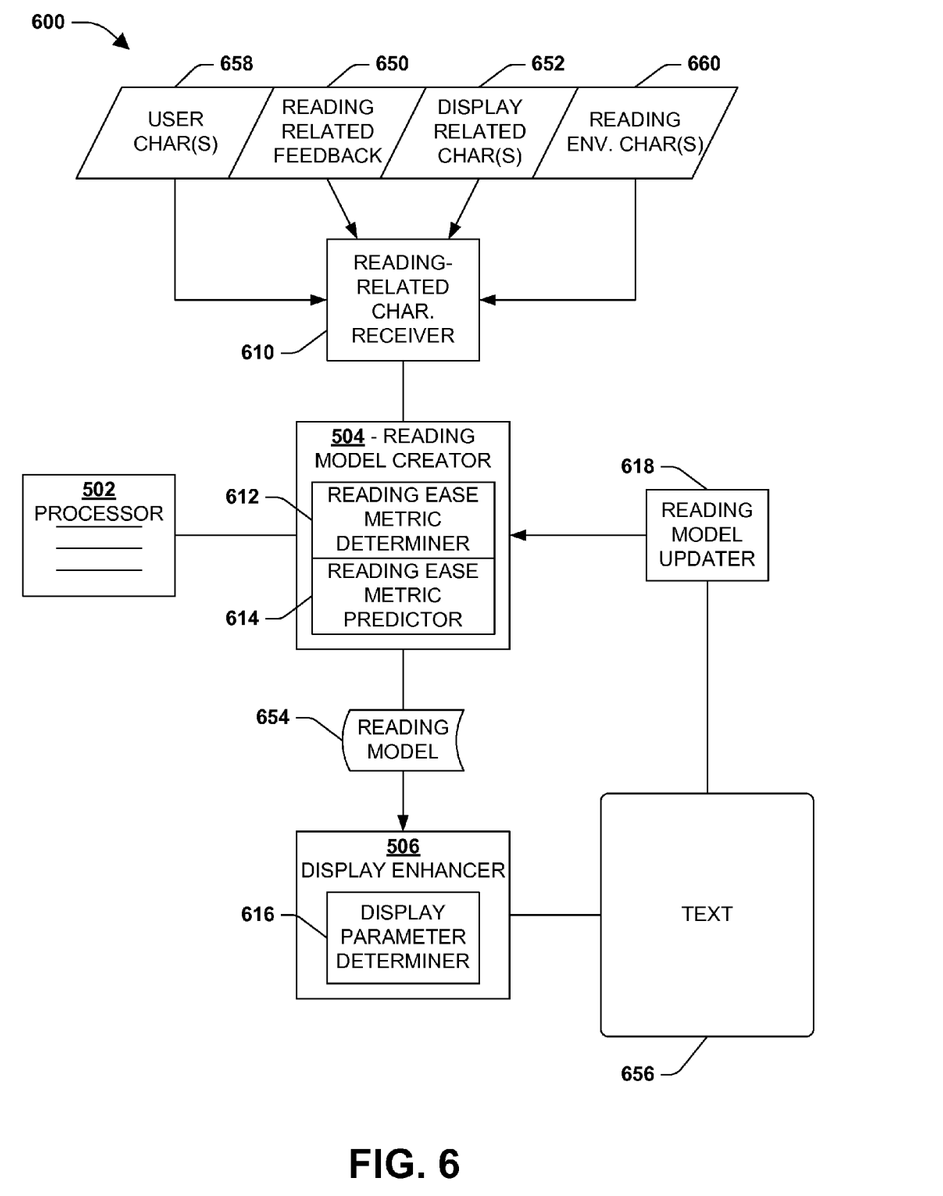
FIG. 6 is a component diagram illustrating an example embodiment where one of more systems described herein may be implemented

FIG. 6 is a component diagram illustrating an example embodiment 600 where one of more systems described herein may be implemented. In this example, an extension of FIG. 6 is provided and thus description of elements, components, etc. described with respect to FIG. 6 may not be repeated for simplicity. A reading-related characteristics receiving component 610 may be configured to receive reading related characteristics. Reading-related characteristics can comprise, among other things, user characteristics 658, reading-related feedback 650, display-related characteristics 652, and/or reading environment characteristics 660, etc. In one embodiment, the respective reading-related characteristics 650, 652, 658, 660, received by the reading-related characteristics receiving component 610, may be received for a first user (e.g., and/or additional users) of a first device (the device) and/or may be received for one or more second users of a second device (e.g., another and/or other device(s)).

In one embodiment, the reading-related feedback 650 may comprise feedback from the user of the device (e.g., reading speed, and/or reading comprehension related information for the user and device). In another embodiment, the reading-related feedback 650 may comprise feedback from a plurality of users for a set of devices comprising a device type, of which the device is member (e.g., users of computer monitors). In another embodiment, the reading-related feedback 650 may comprise feedback from users of a plurality of different device types (e.g., multiple different users of smart phones, laptops, handhelds, computer monitors, e-readers, etc.).

As an example, receiving reading related characteristics for one or more users of one or more devices and/or for a first user of a first device and one or more second users of a second device (e.g., and third device, and fourth, etc.) may provide for creating one or more reading models 654. For example, reading related characteristics for a user of the device may be used to create a reading model 654 merely for the device; while reading-related characteristics for devices of a same device type and/or for a plurality of device types, may be used to create a reading model 654 for a device type and/or for a plurality of device types, respectively, for example.

In the example embodiment 600, the reading model creation component 504 can comprise a reading ease metric determination component 612 that is configured to determine a device reading ease metric for text based at least in part upon the received reading-related characteristics 650, 652, 658, 660 for the device. For example, reading ease metric determination component 612 may identify reading speed, reading comprehension, or a combination of both, as a device reading ease metric. In this example, the device reading ease metric may be used as a measurement to identify a desired reading ease for the device (e.g., to identify an improvement in reading ease).

Further, the reading model creation component 504 can comprise a reading ease metric prediction component 614 that is configured to predict a user reading ease metric based at least in part upon the device reading ease metric and received reading-related characteristics for the user. For example, the received reading-related characteristics for the user, such as user characteristics and/or user reading-related feedback, may be combined with device reading ease metric to create the reading model 654. As an illustrative example, where the device reading ease metric comprises reading speed, the reading model 654 can be created using the reading-related characteristics for the user. In this example, the created reading model 654 may then be used to identify desired reading-related characteristics (e.g., that correspond to display parameters for the displayed text).

In the example embodiment 600, the display enhancement component 506 can comprise a display parameter determination component 616 that is configured to determine a set of desired display parameters for the text 656 on the device. The display parameter determination component 616 can utilize the user reading ease metric and/or the reading model 654 to determine the set of desired display parameters. For example, using the reading model, the display parameter determination component 616 may identify a particular font, font size, color, spacing, font type, page margin(s) and/or line spacing, etc. that improves a user's reading ease for the displayed text 656, based on the user reading ease metric.

A reading model updating component 618 can be configured to update the reading model 654 based at least in part upon updated reading-related feedback, where the updated reading-related feedback comprises feedback resulting from the user reading the text 656 on the device. For example, the user may interact with the displayed text while reading the text, such as by scrolling, switching pages (back and forth), moving their eyes to focus on particular areas of the document, inputting information, etc., which may be able to indicate a reading speed and/or reading comprehension. In this example, the updated feedback can be used by the reading model updating component 618, which may, in-turn, result in updated display parameters for the displayed text 656. In this way, for example, the displayed text 656 can be updated in real-time, and/or periodically updated (e.g., a next time the display is activated).

Figure 7:
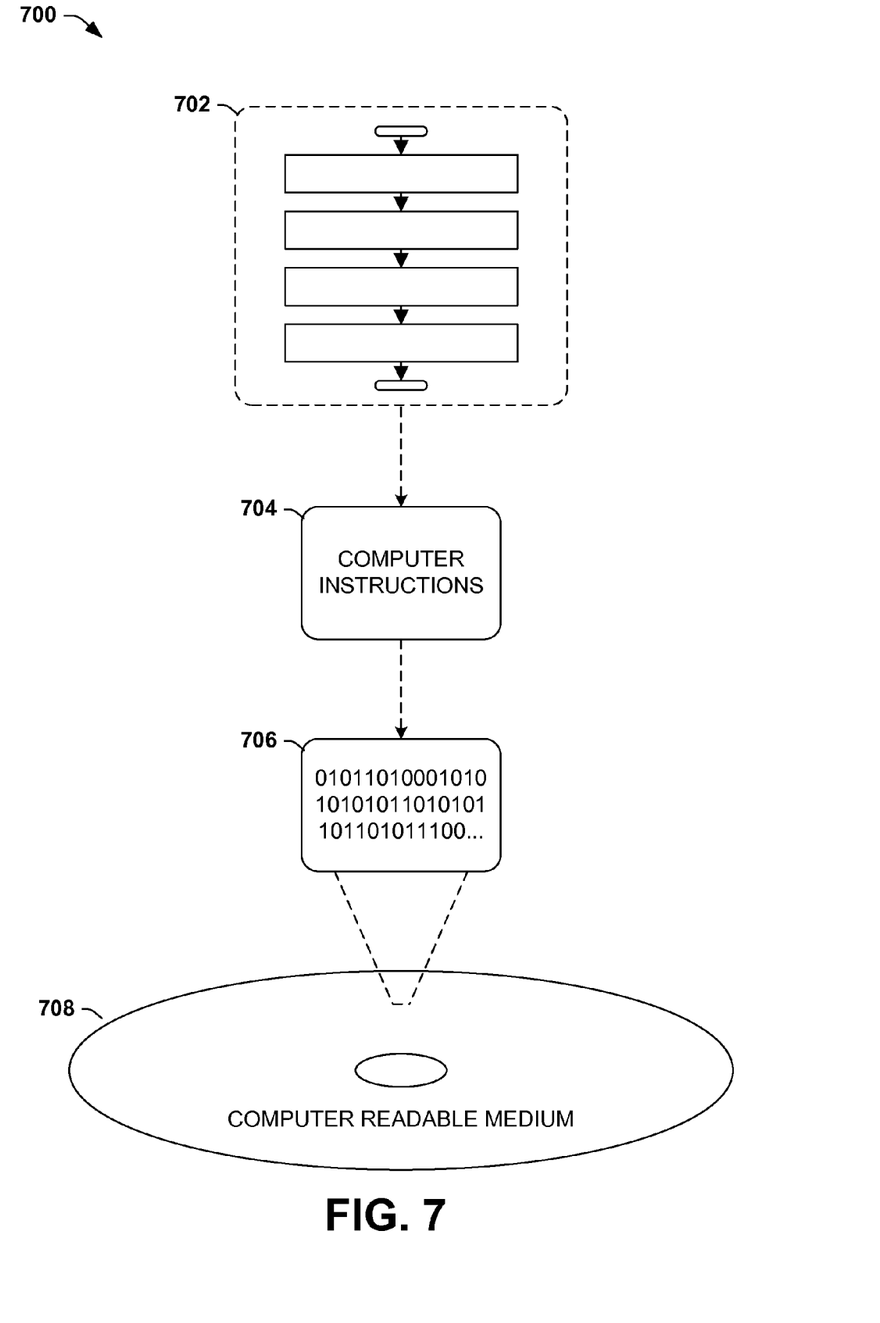
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
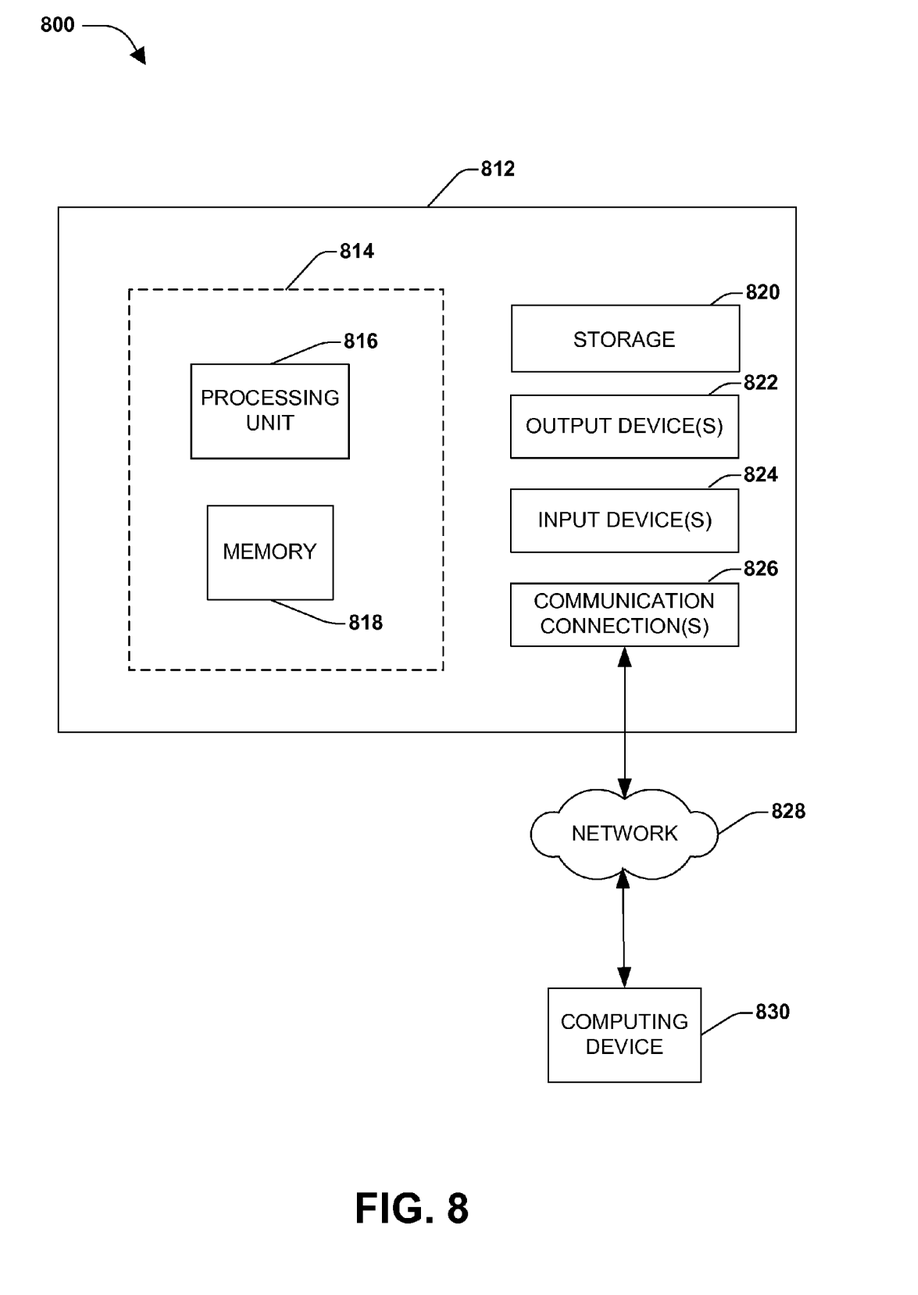
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method implemented by one or more computing devices, the method comprising:
   obtaining reading-related feedback for a particular user, the reading-related feedback indicating reading ease of the particular user of text displayed on a display device;
   obtaining one or more text display-related characteristics of the display device;
   creating a reading model based at least in part upon the reading-related feedback and the one or more text display-related characteristics;
   obtaining reading difficulty information of the text;
   using the reading model with the reading difficulty information of the text to identify desired reading characteristics for the particular user for the text; and
   automatically adjusting one or more display parameters of the display device based at least in part upon the desired reading characteristics.

2. The method of claim 1, wherein the reading difficulty information of the text comprises vocabulary difficulty or average sentence length.

3. The method of claim 1, wherein the desired reading characteristics comprise one or more of:
   a brightness level;
   a contrast level;
   font characteristics;
   line spacing; and
   word spacing.

4. The method of claim 1, wherein the creating the reading model further comprises customizing a general reading model that is built with data from multiple readers and multiple display device types.

5. The method of claim 4, wherein the reading model is customized for the particular user based at least upon the reading-related feedback.

6. The method of claim 4, wherein the reading model is customized for a particular type of the display device based at least upon the one or more text display-related characteristics of the display device.

7. The method of claim 1, wherein the obtaining the reading-related feedback comprises obtaining one or more of:
   a user reading speed; and
   a measure of user reading comprehension.

8. The method of claim 7, wherein the obtaining the reading-related feedback comprises obtaining the user reading speed based at least in part upon one or more of the following user interactions:
   a page scroll rate;
   a switching page view rate;
   user reading speed input; and
   observation of user eye movement.

9. The method of claim 7, wherein the obtaining the reading-related feedback comprises obtaining the measure of the user reading comprehension based at least in part upon one or more of the following user interactions:
   a user look-back rate;
   user comprehension input;
   observation of user activity; and
   observation of user eye movement.

10. The method of claim 1, wherein the one or more text display-related characteristics comprise one or more of:
    alterable characteristics of the display device;
    unalterable characteristics of the display device;
    displayed text characteristics; and
    current page view characteristics.

11. The method of claim 1, further comprising obtaining updated reading-related feedback for the particular user and readjusting the one or more display parameters of the display device based at least in part upon the updated reading-related feedback.

12. The method of claim 11, wherein the one or more display parameters of the display device are repeatedly readjusted based at least in part upon further updated reading-related feedback until a desired reading ease is obtained.

13. The method of claim 11, further comprising updating the reading model based at least in part upon the updated reading-related feedback.

14. A system comprising:
   a processor; and
   a storage device storing computer readable instructions which, when executed by the processor, cause the processor to:
      receive reading-related feedback for a user, the reading-related feedback indicating a reading speed of the user,
      receive content characteristics of text that is to be displayed to the user on a display device,
      access a reading model that is based at least in part upon data from multiple readers using multiple display device types,
      using the reading model, the reading-related feedback for the user, and the content characteristics of the text, determine desired reading characteristics for the user for the text,
      based at least in part upon the desired reading characteristics for the user, customize one or more text display parameters of the display device, and
      display the text to the user on the display device according to the customized one or more text display parameters.

15. The system of claim 14, wherein the reading-related feedback for the user comprises observed interactions of the user with the display device over time.

16. The system of claim 14, wherein the computer readable instructions further cause the processor to identify different text display parameters for the user for different types of display devices based at least in part upon the desired reading characteristics for the user.

17. The system of claim 16, wherein the different text display parameters for the different types of display devices include a font type, a font size, and a font spacing.

18. The system of claim 14, wherein the computer readable instructions further cause the processor to receive environment characteristics of the user and wherein the environment characteristics are used according to the reading model to determine the desired reading characteristics for the user.

19. The system of claim 14, wherein the computer readable instructions further cause the processor to update the reading model based at least in part upon updated reading-related feedback for the user.

20. A computing device comprising:
   a display device;
   a processor; and
   a storage device storing computer-executable instructions which, when executed by the processor, cause the processor to:
      identify reading ease metrics of a user related to text displayed by the display device,
      obtain a reading difficulty level of the text related to content features of the text,
      input the reading ease metrics of the user and the reading difficulty level of the text to a reading ease model to identify desired text-related display characteristics, and
      automatically adjust one or more text display parameters of the display device based at least in part upon the desired text-related display characteristics.

* * * * *